July 28, 1964  A. G. BUHR  3,142,275
PLANTER MECHANISM
Filed Oct. 25, 1961
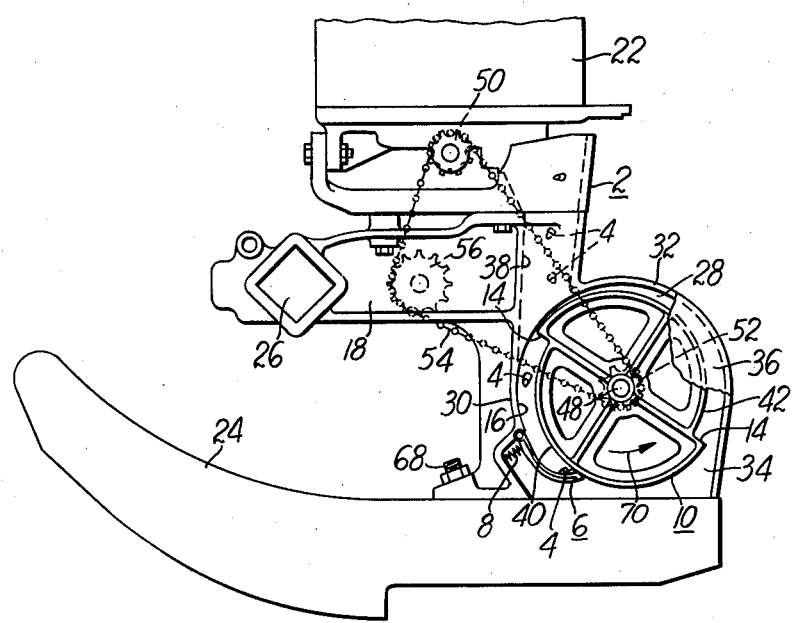
Fig. 1
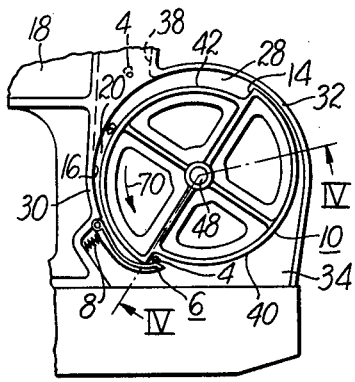
Fig. 2
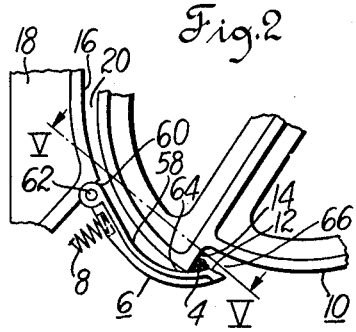
Fig. 3
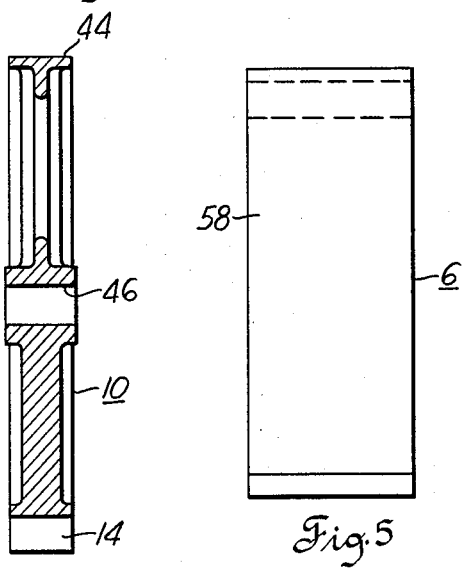
Fig. 4
Fig. 5
Inventor
August G. Buhr
by Howard B. Scheckman
Attorney

United States Patent Office 3,142,275
Patented July 28, 1964

3,142,275
PLANTER MECHANISM
August G. Buhr, La Crosse, Wis., assignor to Allis-Chalmers Manufacturing Company, Milwaukee, Wis.
Filed Oct. 25, 1961, Ser. No. 147,563
2 Claims. (Cl. 111—51)

This invention relates to agriculture and more particularly to an improved seed planter of the type shown in Lutz U.S. Patent 1,751,486.

As the speed of planting increases, so do the problems. It is difficult at high speed to form even hills. This is because the seed scatters more at higher speeds. That is, seed that hits the ground at 10 m.p.h. will roll farther than seed that hits the ground at 2 m.p.h. For this reason, a slight unimportant scatter at slower speeds is magnified and undesirable at higher speeds.

Another problem is that a large number of seed must be rapidly handled at high speed. Therefore, it is important that the seed be handled without cracking or damaging them. Further, if the seed is damaged, they tend to clog and interfere in the operation of the ejector.

It is also desirable that the planter handle all type of seed including smooth coated types, such as corn.

It is an object of this invention to provide a planter that can be used for high speed planting.

It is another object of this invention to provide a planter that can plant even hills at high speeds.

It is another object of this invention to provide a planter that will handle seed with a minimum of damage to the seed.

It is another object of this invention to provide a planter that can plant different types of seed at high speed.

Other objects and advantages will appear from the following description in conjunction with the attached drawings in which:

FIG. 1 is a side view of the planter with certain parts removed for clarity showing the ejector wheel in the seed accumulating position;

FIG. 2 is a view similar to FIG. 1 showing the ejector wheel approaching the ejecting position, with the valve gate open to permit ejection of all the seed as a unit.

FIG. 3 is an enlarged view of FIG. 2 showing the valve gate mechanism and a portion of the ejector wheel;

FIG. 4 is a sectional view of FIG. 2 taken in the direction of arrows IV—IV showing the abutment surface of the ejector wheel; and FIG. 5 is an enlarged view taken in the direction of arrows V—V showing the valve gate.

Invention Generally

Planter 2 can form even hills at high speed because the seed is ejected in a compact group that has little tendency to scatter. As seed 4 is fed, valve 6 that is resiliently urged by spring 8 against the periphery of ejector wheel 10, retards and collects the seed. Valve 6 has curved end 12 (FIG. 3) that serves to check the progress of the seed to form them into a compact group as the seed is ejected from the planter by abutment 14.

The planter does not damage the seed because the seed cannot become trapped between throat surface 16 of boot casing 18 and ejector wheel 10. Throat surface 16 is made smooth. A space 20 is provided between throat surface 16 and ejector wheel 10 that is large enough for trapped seed to pass through.

The smooth throat permits easy passage of all types of seed. If ejector wheel 10 were very close to throat surface 16, it would grind up any trapped seed, and this would interfere with the operation of the ejector wheel.

Invention Specifically

Referring to FIG. 1, there is shown a side view of planter 2. The planter comprises five main parts:
(1) Boot casing or support 18;
(2) Seed hopper 22 (only part being shown) carried by said boot casing 18;
(3) Ejector wheel 10 carried in said boot casing for ejecting seed 4;
(4) Valve 6 to control the ejection of seed; and
(5) Runner opener 24 carried by boot casing 18 to open a furrow in the ground for the reception of the seed.

Boot Casing

Boot casing or support 18 is carried by a draft bar 26 adapted to be propelled by a tractor (not shown). The casing is formed with an ejector wheel receiving chamber 28 formed in part by front wall 30 (FIG. 2) having throat surfaces 16, peripheral wall 32, and side wall 34. A removable cover plate 36 partly shown in FIG. 1 completes the enclosure of ejector wheel 10.

Seed passage 38 communicates with ejector wheel receiving chamber 28 through smooth throat section 16 disposed generally at the upper forward portion of chamber 28.

Hopper

Hopper 22 is of a conventional type and is carried on boot casing 18. The hopper separates seed from bulk, and a hopper feed mechanism (not shown) drops seed 4 in a continuous stream of spaced apart seed through seed passage 38. The stream is fed to the side of the ejector wheel (left side, FIG. 1) that is moving downwardly, to provide as short a trip as possible for the seed.

The seed that are fed by hopper 22 are intersected by continuously revolving ejector wheel 10 that intercepts and accelerates a selected number of seed to a point of ejection.

Ejector

Ejector wheel 10 is generally cylindrical but radially recessed to present two seed cells 40 and 42. Each cell incompasses 180° or half of the periphery of the ejector wheel, and each cell presents a peripheral camlike surface tapering from a radially outermost point to an inner point defined by the associated radial abutment 14. Ejector wheel 10 is formed with a smooth flat rim 44 (FIG. 4).

Each cell gradually deepens and terminates in a relatively deep pocket that forms an abrupt annular extending end wall or abutment 14.

The center of the ejector wheel has an opening 46 that receives a drive shaft 48 journaled for rotation within side section 34 and cover plate 36 of boot casing 18.

Two cells 40, 42 are shown. However, if desired, an ejector wheel with four equally spaced cells can be used where it is desired to provide closer hill spacings.

Hopper 22 and ejector wheel 10 (FIG. 1) carry sprockets 50, 52 that are connected by a roller chain 54 passing over idler sprocket 56. The sprockets can be driven by a ground wheel drive (not shown) or by any drive arrangement. The only requirement is that the seed be fed to the ejector wheel at the rate needed, and the ejector wheel be rotated fast enough to eject the seed at a speed equal to the forward speed of the planter.

Valve

Valve 6 cooperates with ejector wheel 10 and controls the discharge of the seed from the planter. The valve performs three functions: it retards, it accumulates the seed, and it forms the seed into a group as the seed is being ejected.

The valve comprises gate 58 and resilient means in the form of compression spring 8 to urge the gate against the periphery of wheel 10.

Gate 58 is generally J-shaped. The straight end portion 60 of gate 58 is pivoted to the boot casing by means in the form of pivot 62 and the free end portion 12 of the valve plate has an outermost edge which is offset from the plane of the straight end portion 12 a distance greater than the radial height of the abutment 14. Gate 58 moves in an arc about pivot 62.

End 12 of gate 58 is continuously urged into sliding contact with the periphery of wheel 10 by compression spring 8. One end of the spring engages the boot casing and the other end engages the gate. The width of gate 58 (FIG. 5) is equal to the width of ejector wheel 10.

End 12 is intermittently moved back and forth about pivot pin 62 by its engagement with the undulating contour of the rotating feed wheel 10.

It will be noted in referring to FIG. 3, that concave part 64 of gate 58 is substantially horizontal. It collects and positions the seed during feeding. It also continues to support the seed in the path of abutment 14 while the gate is being pivoted open. This concave part 64 supports the seed and prevents it from dropping down while the gate is being opened.

End 12 retard sthe seed by preventing it from exiting. End 12 also checks all the seed to form all the advancing seed into a compact group. End 12 is upwardly curved and extends vertically above midportion 64. When abutment 14 opens the gate, end 12 of the gate is higher than the midportion. Curved end 12 urges the seed against abutment 14 during ejection.

In prior art valves, the seed scatters because it is not checked and formed into a compact group, and then the group is ejected as a unit. Further, with most prior art valves, the seed can dribble out as soon as the valve is opened. This would also scatter the seed.

It will be noted that gate 58 is moved by abutment 14 far enough away from the periphery of wheel 10 to permit all the seed to pass through opening 66 (FIG. 3) at the same time. Part of the seed is not used to force the gate open. If part of the seed is used to cam the gate open, all the seed would not be ejected with the same velocity. As a result, the seed would scatter on the ground.

The gate may be made of nylon for lightness and wear resistance.

*Runner Opener*

Planter runner opener 24 is conventional. It is secured to the planter boot casing by means of bolt 68.

*Operation*

In operation, ejector wheel 10 is rotated in the direction of arrow 70. The ejector wheel is illustrated at the approximate cutoff point in FIG. 1. From the cutoff point to the point of ejection (FIG. 3) the accumulated seed is consolidated and grouped, and at the same time it is collected in the opposite cell for the next hill.

Seed 4 falls down smooth seed passage 38. The seed is retarded and accumulated in the path of abutment 14 by valve 6 during one-half turn of the ejector wheel.

As abutment 14 moves counterclockwise, it cams gate 58 downwardly about pivot 62. Midportion 64 of gate 58 while moving downwardly continues to support the seed in the path of abutment 14. As the seed is pushed by abutment 14, curved end 12 checks its progress to form the seed into a compact group against abutment 14. End 12 is moved away from the periphery of ejector 10 to provide a passage 66 (FIG. 3) through which all the seed can pass at one time without the seed having to force its way through the opening.

Seed 4 is ejected at a speed that is equal to the forward speed of planter 2. That is, if planter 2 is traveling forward at the speed of 10 m.p.h., the ejector wheel will be driven to eject the seed rearwardly at a speed of 10 m.p.h. As a result, both speeds will cancel each other and the seed will drop in a compact cluster with a minimum of roll or bounce.

While the invention is disclosed as making high speed planting possible, it will be apparent that it can be used at slow speeds.

In general terms, the herein disclosed hill-drop mechanism comprises a boot casing, as represented by the casing 18, which supports and surrounds a vertical ejector wheel as represented by the wheel 10. The boot casing presents an upper seed inlet opening, a lower seed outlet opening and an internal wall portion extending downwardly from said inlet opening in confronting relation to the periphery of the ejector wheel and terminating at its lower end on a level below the axis of the ejector wheel and above the peripheral bottom of the latter. A J-shaped valve plate, as represented by the gate 58, is pivoted at its straight end portion on a horizontal axis to said casing at said lower end of said wall portion and positioned so that its curved free end portion extends inwardly with respect to said casing and toward said peripheral bottom of said ejector wheel.

Although a single embodiment of the present invention has been illustrated and described, it will be apparent to one skilled in the art that various changes and modifications may be made therein without departing from the invention or from the scope of the appended claims.

What is claimed is:

1. A hill-drop mechanism for planters comprising, a vertical ejector wheel; supporting means for said ejector wheel including a boot casing surrounding said wheel and presenting an upper seed inlet opening, a lower seed outlet opening, and an internal wall portion extending downwardly from said inlet opening in confronting relation to the periphery of said ejector wheel and terminating at its lower end on a level below the axis of said ejector wheel and above the peripheral bottom of the latter; said ejector wheel being radially recessed to present at least one peripheral camlike seed cell surface tapering from a radially outermost point to an inner point defined by a radial abutment, and the maximum diameter of said ejector wheel being substantially equal to the radial spacing of its center from said internal wall portion of said boot casing; a generally J-shaped valve plate of a width substantially equal to the width of said seed cell surface pivoted at its straight end portion on a horizontal axis to said casing at said lower end of said wall portion and positioned so that its curved free end portion extends inwardly with respect to said casing and toward said peripheral bottom of said ejector wheel; and resilient means operative to urge said valve plate inwardly about said pivot axis, whereby rotation of said ejector wheel will cause back and forth rocking of said valve plate about said pivot axis as said free end portion of said valve plate rides on the periphery of said ejector wheel.

2. A hill-drop mechanism as set forth in claim 1 wherein said free end portion of said valve plate presents an outermost edge offset from said straight end portion a distance greater than the radial height of said abutment of said ejector wheel.

References Cited in the file of this patent

UNITED STATES PATENTS

| | | |
|---|---|---|
| 451,761 | Howland | May 5, 1891 |
| 803,082 | Waterman | Oct. 31, 1905 |
| 988,539 | Balint | Apr. 4, 1911 |
| 1,269,591 | Fischer | June 18, 1918 |
| 1,751,486 | Lutz | Mar. 25, 1930 |
| 2,085,354 | Erickson | June 29, 1937 |
| 2,379,724 | Lanham | July 3, 1945 |

FOREIGN PATENTS

| | | |
|---|---|---|
| 273,291 | Germany | Apr. 24, 1914 |
| 475,086 | Germany | Apr. 17, 1929 |